US012754407B2

(12) United States Patent
Schlaudraff et al.

(10) Patent No.: US 12,754,407 B2
(45) Date of Patent: Oct. 6, 2026

(54) APPARATUSES FOR A MICROSCOPE SYSTEM, MICROSCOPE SYSTEM, METHODS AND COMPUTER PROGRAM

(71) Applicant: Leica Microsystems CMS GmbH, Wetzlar (DE)

(72) Inventors: Falk Schlaudraff, Butzbach (DE); Markus Schechter, Frankfurt (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 357 days.

(21) Appl. No.: 18/472,273

(22) Filed: Sep. 22, 2023

(65) Prior Publication Data

US 2024/0111142 A1 Apr. 4, 2024

(30) Foreign Application Priority Data

Sep. 30, 2022 (DE) ......................... 102022125286.8

(51) Int. Cl.
*G02B 21/24* (2006.01)
*G02B 21/02* (2006.01)

(52) U.S. Cl.
CPC ......... *G02B 21/245* (2013.01); *G02B 21/025* (2013.01); *G02B 21/241* (2013.01)

(58) Field of Classification Search
None
See application file for complete search history.

(56) References Cited

U.S. PATENT DOCUMENTS

| | | | | |
|---|---|---|---|---|
| 5,737,134 A * | 4/1998 | Watanabe | G02B 21/248 | 359/821 |
| 9,215,425 B1 * | 12/2015 | Farrell | G01B 11/24 | |
| 2021/0116695 A1 * | 4/2021 | Weber | G05B 19/0426 | |
| 2022/0114387 A1 * | 4/2022 | Amthor | G06V 10/7515 | |
| 2022/0269062 A1 * | 8/2022 | Matsumura | G02B 21/025 | |
| 2023/0116753 A1 * | 4/2023 | Fahlbusch | G02B 21/248 | 359/381 |
| 2023/0195295 A1 * | 6/2023 | Schechter | G02B 21/365 | 715/771 |

FOREIGN PATENT DOCUMENTS

| | | | |
|---|---|---|---|
| DE | 102010030637 | A1 | 12/2011 |
| DE | 102018131427 | B4 | 4/2021 |
| EP | 1093002 | A2 | 4/2001 |
| EP | 3961287 | A2 | 3/2022 |
| JP | 2022127537 | A | 8/2022 |
| WO | 2019011627 | A1 | 1/2019 |

* cited by examiner

*Primary Examiner* — Derek S. Chapel
(74) *Attorney, Agent, or Firm* — 2SPL Patent Attorneys PartG mbB; Yong Beom Hwang

(57) ABSTRACT

An apparatus for a microscope system is provided. The apparatus comprising one or more processors and one or more storage devices. The one or more processors are configured to receive region information about an accessible spatial region for an objective of the microscope system and to trigger a restriction of a relative movement of the objective based on the region information.

12 Claims, 8 Drawing Sheets

APPARATUSES FOR A MICROSCOPE SYSTEM, MICROSCOPE SYSTEM, METHODS AND COMPUTER PROGRAM

TECHNICAL FIELD

Examples relate to apparatuses for a microscope system, a microscope system, methods and a computer program.

BACKGROUND

Microscope systems, such as upright or inverted, can be used to examine samples. A microscope system has usually an xy-microscope stage for arranging the sample and a microscope objective for image acquisition of the sample. Usually, the stage is movable relative to the microscope objective to scan and/or focus the sample. For example, the stage can be moved in a plane perpendicular to the optical axis of the microscope system, as defined by the microscope objective for scanning. For example, the objective can be moved along the optical axis for focusing. In this way, it is possible to approach specific points at which a sample examination is to take place and/or to define specific regions within which the sample is to be traveled or scanned. The corresponding points or regions are usually entered by a user, for which purpose a visual check is usually carried out by viewing microscopic images. When using known holding devices in which the slide or, more generally, the sample holder assumes a fixed position, the approach to a position and/or the scanning of a region can also take place automatically.

Further, to achieve an automatically scanning also an autofocusing system can be utilized. Autofocusing systems can be divided into two main groups, static and dynamic autofocusing systems, based on the state of the holding device or the sample holder currently out of focus. Static autofocus systems utilize the holding device/sample holder, which remains stationary in an optical path, to determine the extent of defocus. However, due to the moving parts in the microscope system a visual check of the user may be necessary to provide a certain functionality of the microscope system. Thus, there may be a need to improve a concept for automation of a microscope system.

SUMMARY

It is therefore a finding that an automation of a microscope system can be improved by restricting a relative movement, based on region information, of an objective relative to a structure of the microscope system, e.g., a holding device, a sample holder, a sample. The region information relates to an accessible spatial region for the objective and can therefore be used to restrict the relative movement of the objective such that a contact between the structure and the objective can be avoided.

Examples provide an apparatus for a microscope system comprising one or more processors and one or more storage devices. The apparatus is configured to receive region information about an accessible spatial region for an objective of the microscope system and to trigger a restriction of a relative movement of the objective based on the region information. A relative movement of the objective may be a movement of the objective relative to a structure of the microscope system. The structure can be used to arrange a sample for image acquisition, e.g., a sample holder, a holding device. The structure may comprise the sample. A relative movement can be, for example, a movement of the objective to focus the sample. The region information may relate to a parameter of an objective, e.g., a spatial region which can be traversed by the objective (e.g., parallel to the optical axis of the microscope system), a parameter of the structure such as an outer dimension. Thus, the accessible spatial region may be a region which can be traversed by the objective without getting in contact with the structure of the microscope system. By using the accessible spatial region the relative movement of the objective can be restricted. By restricting the relative movement of the objective a contact between the objective and the structure (also referred to as objective crash) can be avoided. In this way, damage to the objective and or the structure could be avoided.

In an example, the apparatus may be further configured to receive, from the microscope system, position information about a relative position of the objective and to compare the relative position of the objective and the accessible spatial region. Further, the apparatus may be configured to trigger the restriction of the relative movement of the objective based on the comparison of the region information and the position information. The relative position may comprise at least one of an x-position, an y-position (e.g., in a plane spanned by an x-axis and a y-axis parallel to the focus plane of the objective) or a z-position (e.g., along a z-axis parallel to the optical axis of the objective) of the objective relative to the structure of the microscope system. By comparing the relative position with the accessible spatial region, the restriction triggered can be improved, e.g., a restriction can only be triggered for a predefined position of the objective. In this way, the actual relative position of the objective can be considered. For example, when the objective is at an edge of the sample holder, the relative movement of the objective can be restricted so that the objective cannot move beyond the edge, e.g., to avoid a contact with a holder device.

In an example, the restriction of the relative movement may be a restriction in at least one of a direction perpendicular or a direction parallel to a focus plane of the objective. For example, the relative movement of the objective can be restricted in the direction parallel to an optical axis (perpendicular to the focus plane), e.g., by restricting an autofocus of the objective. By restricting the autofocus a relative movement of the objective perpendicular to the structure can be restricted. In this way, an objective crash caused by focusing, can be avoided. For example, the relative movement of the objective parallel to the focus plane (perpendicular to the optical axis) may be restricted, e.g., by restricting a scanning of the sample. By restricting scanning of the sample a relative movement of the objective parallel to the structure can be restricted. In this way, an objective crash caused by scanning, can be avoided.

In an example, the region information may further comprise data about at least one of a topography of a currently used sample holder, a topography of a currently used sample or a parameter of the currently installed objective of the microscope system. By using the topography and/or the parameter the accessible spatial region can be defined, e.g., by an outer dimension of the sample or sample holder or a characteristic of the objective, e.g., a focus length of the objective. In this way, the restriction of the relative movement can be improved.

In an example, the apparatus may be further configured to perform an autofocus routine based on the restriction of the relative movement of the objective. For example, an autofocus routine can be performed by selecting an autofocus routine from a plurality of autofocus routines. By performing an autofocus routine the relative movement perpendicular to the focus plane can be restricted. In this way, an automation can be improved while at the same time it can be ensured that an objective crash is avoided.

In an example, the apparatus may be further configured to restrict an autofocus length of an autofocus routine based on the restriction of the relative movement of the objective. The autofocus length can be the length that the objective can traverse for focusing. The autofocus length can be perpendicular to the focus plane of the objective. In this way, an objective crash during autofocusing can be avoided if focusing of the sample is not possible.

In an example, the apparatus may be further configured to trigger a change of the objective of the microscope system to another objective of the microscope system, wherein the accessible spatial region for the objective and the other objective is different. By triggering a change, a used objective can be changed to cover an area of a sample/sample holder with a second objective not accessible for a first objective (e.g., focusing may be not possible). In this way, the objective can be selected in dependence of the accessible spatial region.

In an example, the apparatus may be further configured to trigger an output for informing a user of the microscope system about a relative movement restriction of the objective. In this way, the user can be informed about a restriction during image acquisition.

Examples provide an apparatus for a microscope system comprising one or more processors and one or more storage devices. The apparatus is configured to receive, from the microscope system, position information about a relative position of an objective of the microscope system and to compare the position information with an accessible spatial region for the objective. Further, the apparatus is configured to control a relative movement of the objective based on the comparison so that the objective of the microscope system stays within the accessible spatial region. By receiving the position information the accessible spatial region can be compared with the position information. By comparing the relative movement can be controlled to avoid an objective crash. In this way, a damage to the objective and/or a structure of the microscope system could be avoided.

In an example, the position information may comprise data about at least one of a position of the objective in a direction parallel or perpendicular to a focus plane of the objective relative to the structure. In this way, an objective crash during scanning and/or focusing can be avoided.

In an example, the relative movement of the objective may be controlled by a restriction of the relative movement in at least one of a direction perpendicular or a direction parallel to a focus plane of the objective. In this way, the relative movement of the objective can be restricted for a critical direction.

Examples provide a microscope system, comprising an apparatus as described above.

Examples provide a method for a microscope system comprising receiving region information about an accessible spatial region for an objective of the microscope system. Further, the method comprises triggering a restriction of a relative movement of the objective based on the information about the accessible spatial region.

Examples provide a method a for a microscope system, comprising receiving, from the microscope system, position information about a relative position of an objective of the microscope system. Further, the method comprises comparing the position information with an accessible spatial region of the objective and controlling a relative movement of the objective based on the comparison so that the objective of the microscope system stays within the accessible spatial region.

Examples further relate to a computer program having a program code for performing the method described above, when the computer program is executed on a computer, a processor, or a programmable hardware component.

SHORT DESCRIPTION OF THE FIGURES

Some examples of apparatuses and/or methods will be described in the following by way of example only, and with reference to the accompanying figures, in which FIGS. 1*a* and 1*b* show a block diagrams of examples of an apparatuses and FIG. 1*c* shows a schematic illustration of a microscope system;

FIG. 2 shows an example of a schematic illustration of a microscope system;

FIGS. 3*a* and 3*b* show a schematic illustration of a microscope housing part shown in FIG. 1*c;*

FIGS. 4*a* and 4*b* show examples of different relative position of an objective to a sample holder and a holding device;

DETAILED DESCRIPTION

As used herein the term “and/or” includes any and all combinations of one or more of the associated listed items and may be abbreviated as “/”.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Various examples will now be described more fully with reference to the accompanying drawings in which some examples are illustrated. In the figures, the thicknesses of lines, layers and/or regions may be exaggerated for clarity.

Figure 1A:
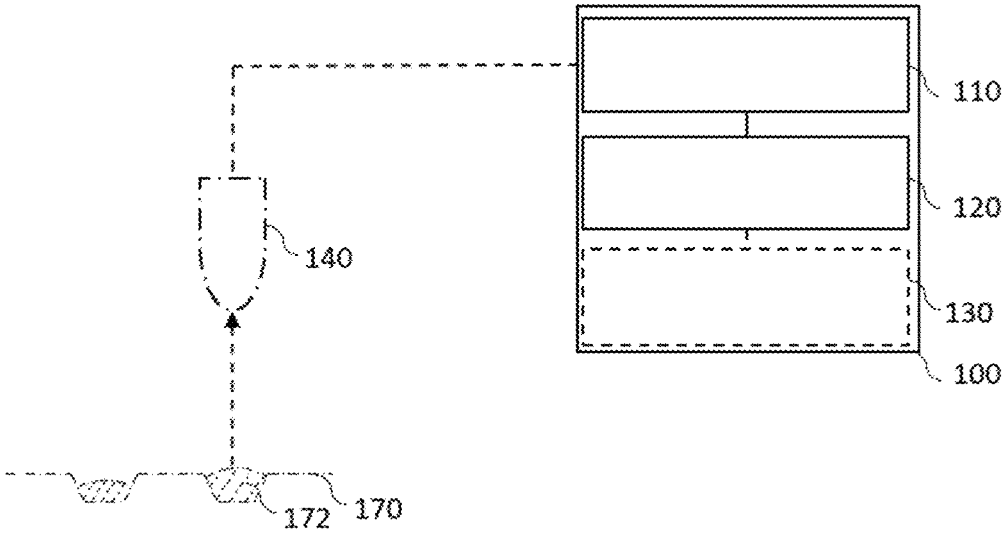
Figure 1B:
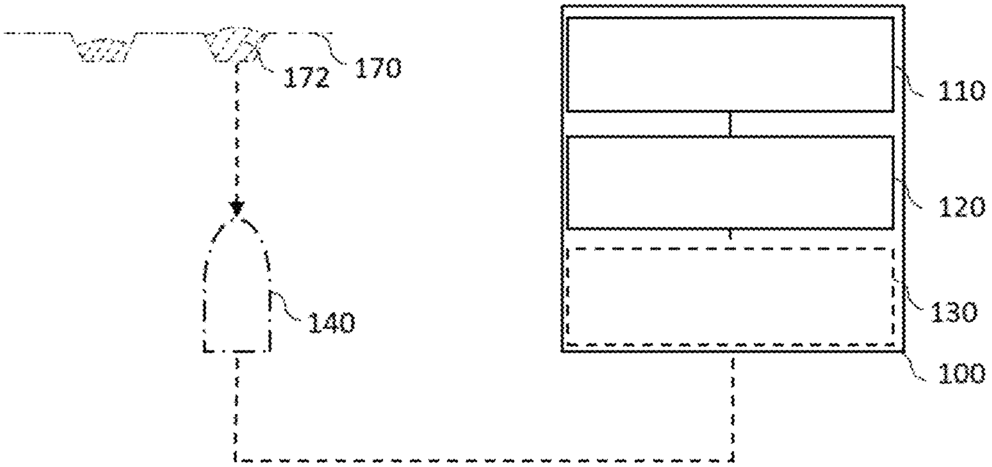

FIGS. 1*a* and 1*b* show examples of block diagrams of apparatuses 100. The apparatus 100 comprises one or more processors 110 and one or more storage devices 120. The apparatus 100 is configured to receive region information about an accessible spatial region for an objective 140 of the microscope system. Further, the apparatus 100 is configured to trigger a restriction of a relative movement of the objective 140 based on the region information. The relative movement may be a movement of the objective 140 relative to a structure of the microscope system. By restricting a relative movement of the objective 140 an objective crash can be avoided. For example, the relative movement of the objective 140 can be restricted to maintain a minimum distance between the objective 140 and the structure.

Figure 1C:
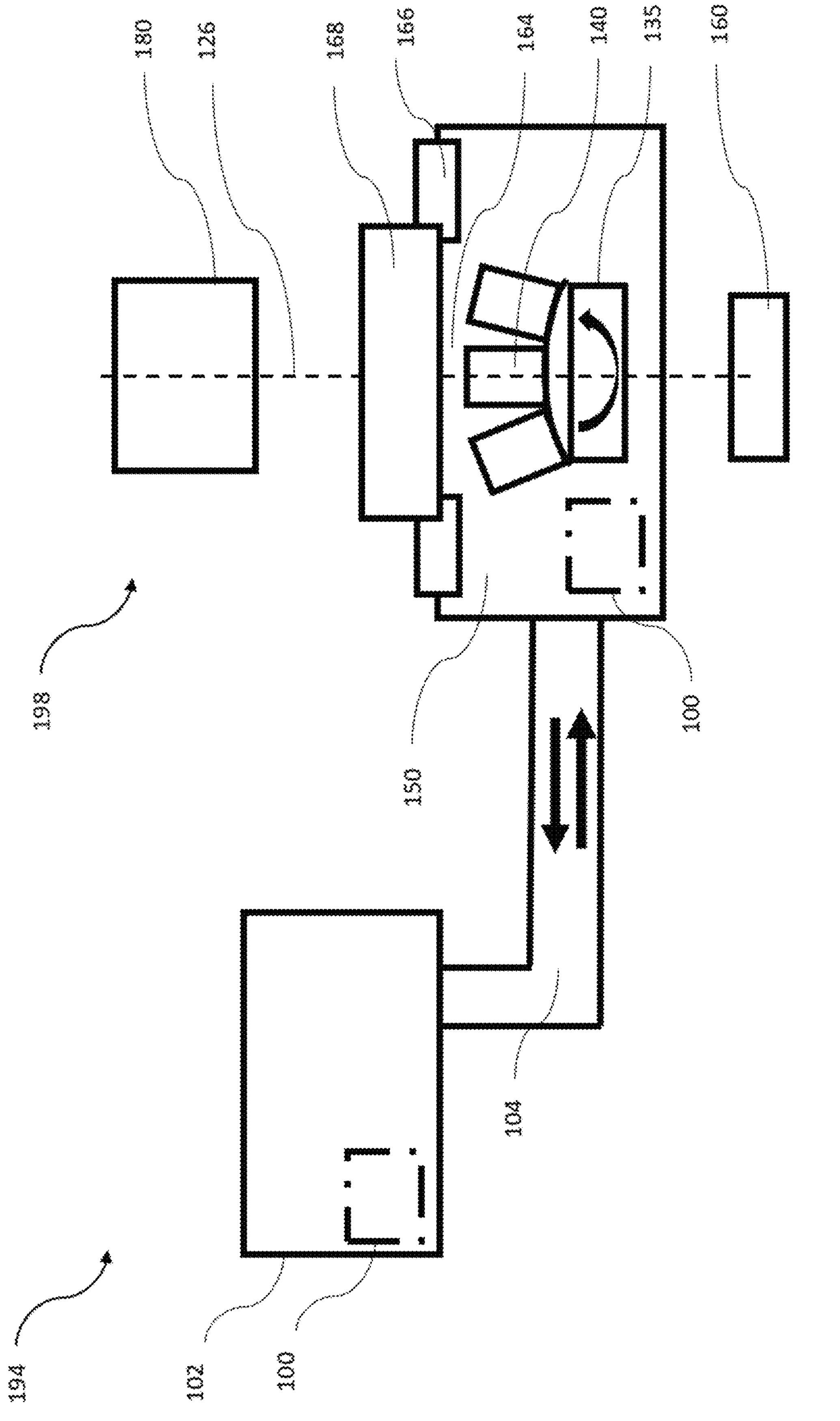

In FIG. 1*a* the apparatus 100 is integrated into an upright microscope system, whereas in FIG. 1*b* and FIG. 1*c* the apparatus is integrated into an inverse microscope system 194.

The structure may be associated with the sample 172 under test. For example, the structure may comprise or may be identical to the sample 172. Optionally or alternatively, the structure may be for arranging the sample 172, e.g., a sample holder 170, holding device. The structure may comprise the sample, the sample holder and the holding device, for example.

For example, in the upright microscope system in FIG. 1*a*, a sample dimension may restrict a relative movement of the objective, whereas for the inverse microscope system 194 in FIG. 1*b*, the sample dimension is irrelevant to the relative movement of the objective 140. For the upright microscope system the dimension of the structure on a top side may be relevant (e.g., see in FIG. 2 the holding device 268, which protrudes in the direction of the nosepiece 235). For the inverse microscope system 194 the dimension of the structure on a bottom side may be relevant (e.g., see in FIGS. 3 and 4 the edges of the holding device 368, 468).

For an automated microscope system, e.g., a light microscope system, objectives should be prevented from contacting the structure, e.g., the sample 172, the sample holder 170 or the holding device 168. An objective crash between the objective 140 and the structure should be avoided to prevent damage to the objective 140 and the sample 172, the sample holder 170 or holding device 168. This may be of particular interest for immersion objectives or objectives with a short working distance. Thus, by restricting the relative movement of the objective 140 based on the accessible spatial region an objective crash can be avoided and thus a damage to the objective 140, sample 172, sample holder 170, or holding device 168 can also be avoided. Further, by restricting the relative movement of the objective 140, the operability of the microscope system for a user can be improved. Automation of the microscope system can also be improved.

For example, the microscope system may comprise a motorized system (e.g., a motorized stage 166) allowing a relative movement of the objective 140 in at least a direction parallel to the optical axis of the objective 140. Thus, by restricting the relative movement of the objective 140 (e.g., relative to the sample holder 170) an autofocus routine for finding and focusing the sample 172 located in a suitable sample holder 170 can be used without a danger of an objective crash.

The accessible spatial region for the objective 140 may be a region, e.g., an accessible volume in space, which can be relatively traversed by the objective 140 without getting in contact with the structure. The accessible spatial region may be relatively traversed by the objective 140 by moving the objective 140 or the structure.

The accessible spatial region may be defined by a characteristic of the objective, e.g., by a maximum traversing length of the objective, by an outer dimension. Further, the accessible spatial region may be defined by a characteristic of the structure, e.g., by a maximum traversing length of the sample 172, by an outer dimension of the sample 172. Further, the accessible spatial region may be defined by a position of the objective and/or the structure.

The accessible spatial region can be defined in a direction along an axis, e.g., along the optical path of the objective 140 perpendicular to the focus plane, also referred as z-axis, for example. The accessible spatial region can be defined by a plane, e.g., an xz-plane spanned by the z-axis and an x-axis perpendicular to the z-axis or an xy-plane (parallel to the focus plane of the objective 140) spanned by an x-axis and a y-axis perpendicular to the z-axis. The accessible spatial region can be defined by a volume, e.g., spanned by the z-axis and the xy-plane. Therefore, a relative movement of the objective 140 can be restricted in one direction, e.g., along the x-axis, the y-axis or the z-axis, or in two directions, e.g., in the xy-plane or in three directions. In this way, the relative movement of the objective 140 can be restricted to account for the outer dimension of the structure and/or the objective 140 of the microscope system, e.g., a topography of the sample 172, the sample holder 170 or the holding device 1688, in any direction necessary to prevent an objective crash.

The relative movement of the objective 140 may be a movement of the objective 140 relative to the structure. For example, the structure, e.g., a sample holder 170, may be moved relatively to the objective 140 in an xy-plane for scanning the sample holder 170, e.g., for scanning different wells of a multi-well plate. For this purpose, the objective 140 and/or the stage of the microscope system can be moved. Further, the objective 140 may be moved in the z-direction relative to the structure to focus the sample 172, e.g., during an autofocus routine, for example.

For example, the apparatus 100 may receive the region information from the one or more storage devices 120 by reading out information stored in the one or more storage devices.

Optionally or alternatively, the region information can be received from the microscope system, e.g., a control unit (e.g., the control unit 102 shown in FIG. 1*c*) of the microscope system. The apparatus 100 may comprise interface circuitry for receiving the region information from the control unit. The control unit may comprise interface circuitry to provide data indicative of the accessible spatial region, e.g., received from a user input, from a sensor for identifying the holding device, a sensor for identifying a currently installed objective.

For example, the control unit of the microscope system may perform a change of the objective 140 currently installed in the microscope system and may transmit a region information signal to the apparatus 100 comprising data indicative of the currently installed objective 140. The region information signal may comprise the accessible spatial region or data indicative of the accessible spatial region.

For example, the region information signal may comprise data indicative of an identifier of the currently installed objective 140. Thus, the apparatus 100 may read out the accessible spatial region from the one or more storage devices 120 based on the identifier of the objective 140. For example, a user may input a type of an objective 140 to be used, the control unit of the microscope system may change the objective, e.g., by transmitting a change signal to an actor responsible for changing the objective 140 and may transmit the user input to the apparatus 100. The apparatus 100 can receive the region information from the one or more storage devices 120 based on the user input to restrict the relative movement of the objective 140. For example, the control unit of the microscope system may receive an input from a user about a currently used sample holder 170, e.g., a slide, a Petri dish, a multi-well plate. The control unit may transmit a region information signal indicative of the currently installed sample holder 170 to the apparatus 100. Thus, the apparatus 100 can receive the region information from the one or more storage devices 120 to restrict the relative movement of the objective 140.

For a microscope system procedure multiple standardized sample holder 170 and holding devices are known. Further, a parameter, e.g., an outer dimension, of these standardized sample holder 170 and holding devices may be known. Furthermore, working distances of objectives and/or outer dimensions of used objectives, as well as procedures of autofocus routines in the microscope system may be known. These parameters can be stored in the one or more storage device 120 enabling the apparatus 100 to receive the region information from the one or more storage devices 120 by an identifier of a currently used structure and/or objective. For example, if the relative movement of the objective is restricted to avoid an on objective crash so that a working distance of the objective 140 is insufficient for image acquisition of the sample 172, a relative movement of the objective 140 may be disabled. Further, an output informing the user about the disabled relative movement can be triggered. In this way, a user may receive a feedback that a change of the objective 140, e.g., to an objective with a sufficient (e.g., higher) working distance may be necessary for image acquisition of the sample 172.

The apparatus 100 comprises, as shown in FIG. 1, one or more processors 110 and one or more storage devices 120. Optionally, the apparatus 100 may further comprise an interface circuitry 130. The one or more processors may be (communicatively) coupled to the one or more storage devices 120 and optionally to the interface circuitry 130. In general, the functionality of the apparatus 100 is provided by the one or more processors 110, in conjunction with the one or more storage devices 120 (for receiving the region information). Optionally or alternatively the region information may be received via the interface circuitry 130.

Figure 2:
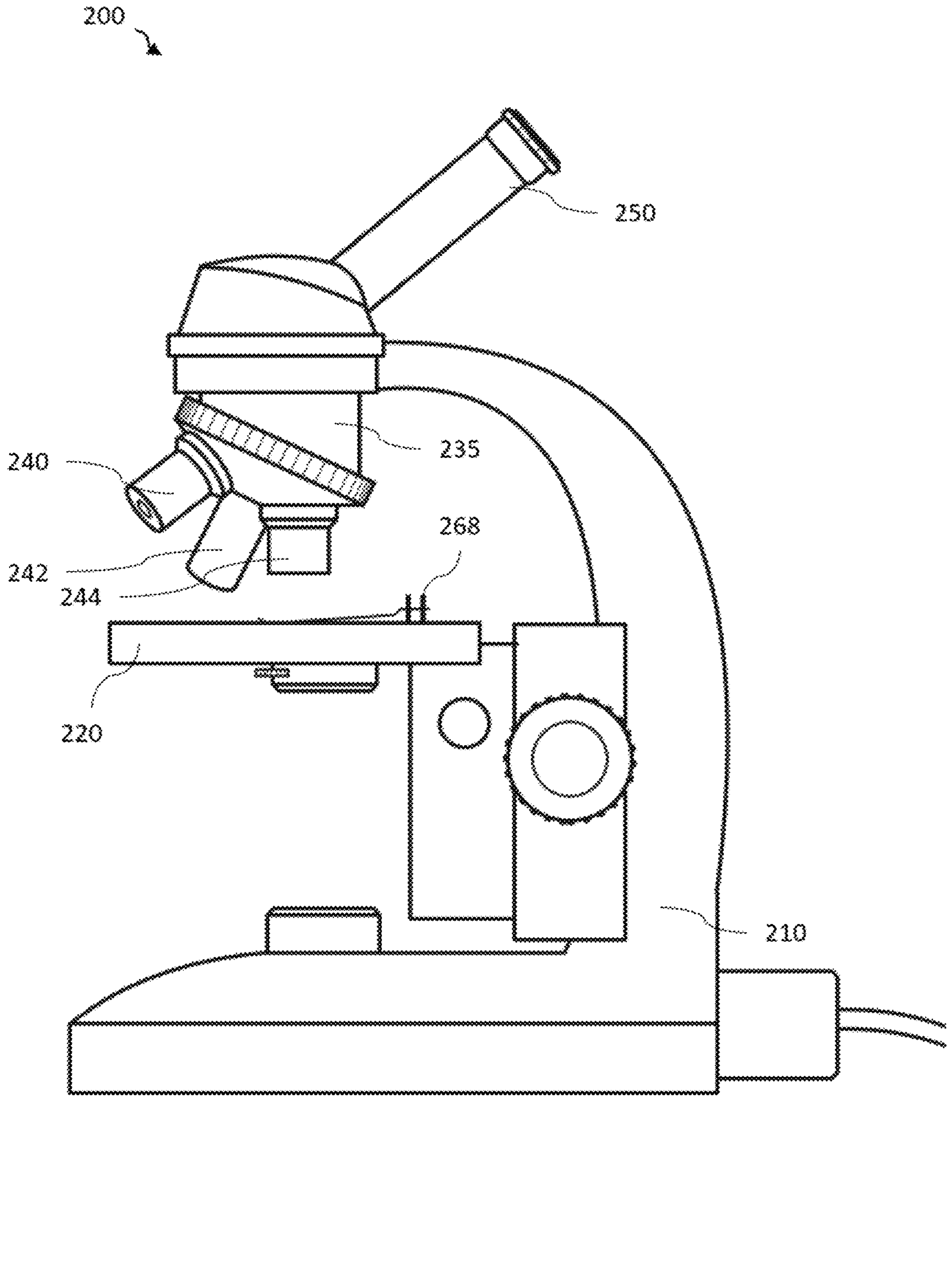

The proposed concept is built around two main components—a microscope system 194, e.g., an upright (as shown in FIG. 2) or an inverse microscope system 194 equipped with a (set of) objective(s) 140, which comprises the optical components, and the apparatus 100 (housed by the microscope system 198, e.g., the control unit 102), which is used to trigger a restriction of the relative movement of the objective 140.

In general, as shown in FIG. 1*c*, the microscope system 194 may comprise a microscope 198, e.g., an inverse microscope 198. The microscope 198 can be an optical instrument that is suitable for examining objects that are too small to be examined by the human eye (alone). For example, a microscope 198 may provide an optical magnification of a sample, such as the sample 172 shown in FIGS. 1*a*, 1*b*. In modern microscopes, the optical magnification is often provided for a camera 160 or an imaging sensor, such as an optical imaging sensor. The microscope 198 may further comprise one or more optical magnification components that are used to magnify a view of the sample 172, such as an objective 140.

There are a variety of different types of microscopes 198. If the microscope 198 is used in the medical or biological fields, the sample 172 being viewed through the microscope 198 may be a sample 172 of organic tissue, e.g., arranged within a petri dish, multi well plate or present in a part of a body of a patient. However, the proposed concept may also be applied to other types of microscope systems, e.g., microscopy in a laboratory or microscopy for the purpose of material inspection.

In an example, the apparatus 100 may be further configured to receive, from the microscope system 194, position information about a relative position of the objective 140 and to compare the relative position of the objective 140 and the accessible spatial region. Further, the apparatus 100 may be configured to trigger the restriction of the relative movement of the objective 140 based on the comparison of the region information and the position information. In this way, the actual relative position of the objective can be considered.

For example, the microscope system, e.g., the microscope 198, may comprise a stage 166 which allows a readout of an x-position, a y-position and/or a z-position of the stage 166.

By determining the position of the stage 166 the position of the structure, e.g., the sample holder 170, can be determined. The position of the structure can be used to determine the relative position of the objective 140. For example, the relative position of the objective 140 can be determined based on the outer dimension of the structure, a position of the structure, a position of the objective 140 and/or an outer dimension of the objective 140. In this way, the relative movement can be restricted in an improved way based on the position of the structure.

In general, as shown in FIG. 1*c*, the microscope system 194 may comprise a control unit 102 to control the microscope 198, e.g., to change an objective or to control a movement of the stage 166. The control unit 102 may be communicatively coupled, e.g., via the connection 104, to an actor to change the objective 140 and/or to move the stage 166. The control unit 102 may comprise or may be the apparatus 100. Alternatively, the microscope 198 may comprise the apparatus 100 and the apparatus 100 may be communicatively coupled to the control unit 102 via the connection 104. The connection 104 can be a wireless connection or a wired connection, for example.

For example, the microscope 198 may comprise a plurality of objectives 140 arranged in a nosepiece 135. A first objective of the plurality of objectives may have a greater outer dimension, e.g., a greater length, than a second objective of the plurality of objectives. Therefore, the accessible spatial region for the first objective may be smaller as for the second objective (see also FIGS. 2 and 3). An objective crash may occur for the first objective in a position of the stage 166, in which a usage of the second objective may be uncritical. Thus, the apparatus 100 may not trigger a change of the objective if this would cause an objective crash. In this way, an objective crash by changing the objective can be prevented.

As shown in FIG. 1*c* the objective 140 may be arranged along the optical axis 126. The optical axis may be formed by an illumination source 180 (e.g., light source in the form of an LED or laser or light source device in the form of a matrix of light sources or in the form of an array of light sources), for illuminating the sample 172 and a camera 160, for image acquisition of the sample 172. For example, the nosepiece 135 and therefore the objective 140 may be fixed at a position of the optical axis 126 in the microscope housing part 150. To scan a sample 172 hold by the holding device 168, the stage 166 can be moved relative to the optical axis 126 and the objective 140. Moving the stage 166 and therefore the holding device 168 may increase the likelihood of an objective crash, e.g., in an edge region of the holding device 168 with protruding parts (see. FIGS. 3 and 4). To prevent an objective crash the apparatus 100 can restrict the relative movement of the objective 140, e.g., in the xy-plane for scanning or in the z-direction for an autofocus. The restriction of the relative movement is based on the region information.

The objective may be arranged below an opening 164 of the stage 166. The space between the objective 140, the stage 166 and the holding device 168 may be the accessible spatial region of the objective 140. For example, the accessible spatial region may depend on the outer dimension of the stage 166 (the dimension of the opening 164), the outer dimension of the (currently installed) holding device 168 and/or the outer dimension of the objective 140. For an upright microscope system as shown in FIG. 1*a*, the outer sample dimension may be of interest.

In an example, the restriction of the relative movement may be a restriction in at least one of a direction perpendicular or a direction parallel to a focus plane of the objective 140. The restriction in a direction perpendicular to the focus plane may be a restriction in the z-direction (along the optical axis 126). The restriction in a direction parallel to the focus plane may be a restriction in the xy-plane, e.g., in the x-direction and/or in the y-direction.

The relative movement of the objective 140 can be restricted in any direction individually or in any combination thereof. For example, a restriction of the relative movement in the z-direction may be based on selecting an autofocus routine or adjusting an autofocus routine. For example, a restriction of the relative movement in the x-direction or in the y-direction may be based on restricting a movement of the stage 166 or the objective 140 in the xy-plane for scanning. In this way, an objective crash can be avoided by restricting the relative movement of the objective in any critical direction.

In an example, the region information may further comprise data about at least one of a topography of a currently used sample holder 170, a topography of a currently used sample 172 or a parameter of the currently installed objective 140 of the microscope system. By receiving data about a currently used/installed (part of the) structure, for example, a relative position of the objective 140, a traversing length of the objective, a traversing length of the stage, an outer dimension of the objective 140, information about an actual configuration of the microscope system can be received. For example, an outer dimension of a holding device 168 may restrict a relative movement of the objective 140 in a z-direction. In this way, the restriction of the relative movement can be adjusted to a currently used structure and/or a currently installed objective 140.

For example, the region information may comprise information about a topography of a currently used multi-well plate. Using an upright system and a sample in a 6-well plate, the objective needs to dip into a well for sample visualization. Further, the relative position of the objective 140 may indicate that the objective 140 is located in well 1 and needs to move to well 2 of the 6-well plate. Thus, a relative movement of the objective 140 in the xy-plane may result in an objective crash. Therefore, the relative movement of the objective 140 in the xy-plane can be restricted or requires a first movement in z-direction to free up the objective for xy movement.

For example, a relative movement in the xy-plane can be blocked until the objective 140 has traversed to a relative z-position, which allows a relative movement in the xy-plane. Thus, only a relative movement in the z-direction may be allowed to adjust the distance between the multi-well plate and the objective 140 to enable a relative movement in the xy-plane. When the objective 140 has reached a predefined distance to the multi-well plate, the restriction in the xy-plane can be removed. For example, when the stage is fixed in z-direction a movement of the stage parallel to the xy-plane may depend merely on a predefined z-position of the objective 140. The predefined z-position of the objective 140 may depend on the region information, e.g., the outer dimension of the multi-well plate. Thus, the outer dimension of the multi-well plate may be used to determine, e.g., select, the predefined z-position. If the position of the objective 140 exceeds the predefined z-position the relative movement of the objective may be restricted. In this way, an objective crash can be avoided in an eased way. For example, the apparatus may receive region information about the z-position of the objective 140 and the outer dimension of the multi-well plate. Based on outer dimension the apparatus 100 can select a predefined z-position. The predefined z-position can be compared by the apparatus 100 with the received z-position of the objective 140. Based on the comparison a restriction of the relative movement can be triggered.

In an example, the apparatus 100 may be further configured to perform an autofocus routine based on the restriction of the relative movement of the objective 140. For example, an autofocus routine can be performed by selecting an autofocus routine from a plurality of autofocus routines. For example, based on the restriction of the relative movement of the objective 140 an autofocus routine can be selected. In this way, a relative movement of the objective 140 in the z-direction can be restricted.

For example, an autofocus routine to be performed by the apparatus 100 may be based on the restriction of the relative movement of the objective 140. This may have the effect that a relative movement in the z-direction of the objective 140 can be restricted. For example, in a motorized inverted microscope system, in which the stage can be moved relative to the objective 140 a multi-well plate may be currently used. The multi-well plate may be mounted to a holding device suitable for holding the multi-well plate. An autofocus routine for image acquisition, e.g., parameters of the autofocus routine defining the traversing length in z-direction, can then be selected or adjusted as a function of the multi-well plate. In this way, an automated image acquisition with reduced risk of an objective crash can be achieved. For example, the autofocus routine may depend on the predefined z-position. Different autofocus routines may be assigned to different predefined z-position. Based on the predefined z-position a selection of the autofocus routine can be made.

To select an appropriate autofocus routine, e.g., the best possible autofocus routine, and optionally to limit a relative movement in z-direction of the objective 140 the accessible spatial region may be considered to avoid an objective crash. Optionally, parameters of the objective, such as a working distance and/or a motion sequence of an autofocus routine may be taken into account for selecting the autofocus routine. For example, a combination of a relative movement of the objective 140 in the xy-plane and a time needed to focus the sample 172 may be used to select an autofocus routine, e.g., an autofocus routine with a short time needed to perform an image acquisition of desired samples 172 of the sample holder 170.

Optionally, the selection of the autofocus routine may depend on the relative position of the objective 140, e.g., for special sample holder 170 such as a multi-well plate with high skirt (which are often used because of their manageability with robotics). For example, a position of the stage of the microscope system can be determined by the control unit of the microscope system. The position of the stage may be received at the apparatus 100 from the microscope system. Based on the position of the stage a position of the objective 140 relative to the structure can be determined, e.g., the objective can be traversed to a relative position below (inverse system) or above (upright system) the structure. This can be used to distinguish whether the microscope system, especially the microscope, may be a subject to an increased object crash probability.

For example, in the case of an inverted microscope system a position close to an edge of the structure, e.g., an outer row or column or corner position of a multi-well plate, may increase a likelihood of an objective crash. In the case of an upright microscope system a position close to an edge of the structure, e.g., an edge of a Petri dish, may increase a likelihood of an objective crash. In contrast a position in a center of the multi-well plate or Petri dish may decrease a likelihood of an objective crash in either case, since there are no protrusion (see, e.g., the structure in FIG. 4 comprising a protrusion at an edge).

Optionally, a restriction of the relative movement of the objective 140 in the z-direction can be done independently of a performed autofocus method based on the relative position of the objective 140. For example, the objective 140 may be centered within a multi-well plate in a relative z-position at a first relative xy-position that is allowed in the center. An attempt may be made, e.g., by a user, to traverse the objective 140 to another relative xy-position, where that z-position would no longer be allowed. Thus, the relative movement of the objective 140 can be restricted, especially in the x-direction and/or the y-direction. Thus, only a relative movement in the z-direction may be allowed to prevent an objective crash. For example, the user may receive information that in the actual relative xyz-position of the objective 140 a movement in the xy-plane may be restricted or forbidden.

For example, an autofocus routine can be selected based on an autofocus length. The autofocus length can be a length that the objective 140 can traverse during focusing. Thus, the autofocus routine can be selected such that no contact between the objective 140 and a structure of the microscope system may be possible during focusing. For example, the accessible spatial region may allow a particular autofocus length and thus the autofocus routine may be selected based on the particular autofocus length.

Optionally or alternatively an autofocus routine can be selected based on a focus method, e.g., adaptive focus control, software autofocus. For example, when the accessible spatial region allows only a specific focus method, the autofocus routine can be selected merely from these autofocus routines.

In an example, the apparatus 100 may be further configured to restrict an autofocus length of an autofocus routine based on the restriction of the relative movement of the objective 140. For example, an autofocus routine can be adjusted by restricting the autofocus length, e.g., by reducing a maximum value in z-direction. The maximum value in z-direction may be defined by the structure of the microscope system. In this way, by adjusting the autofocus routine by restricting the autofocus length an objective crash can be avoided.

In an example, the apparatus 100 may be further configured to trigger a change of the objective 140 of the microscope system to another objective of the microscope system, wherein the accessible spatial region for the objective 140 and the other objective is different. For example, the structure of the microscope system may divide the accessible spatial region in two different regions, e.g., a center region and an edge region. In the center region a width of the structure may be smaller than in the edge region or the sample holder limits the possible diameter of the objective. Thus, the accessible spatial region may be in the center region wider than in the edge region. To achieve appropriate measurements results an objective 140 with a higher magnification and typically a lower working distance can be used for image acquisition in the center region. An objective 140 with a comparable lower magnification and typically larger working distance can be used for image acquisition in the edge region without a risk to crash into the structure or parts of the holder due to the higher working distance allowing more space between objective and structure. Thus, the apparatus 100 may trigger the change of the objective 140 after image acquisition in the center region or the edge region is finished to allow image acquisition in the remaining region with another objective. In this way, automation can be improved, e.g., appropriate objectives can be used for image acquisition in dependence of a structure of the microscope.

Optionally, a restriction of the movement may be associated with a plurality of objectives currently installed in the microscope system e.g., in a nosepiece of the microscope system. For example, a restriction for each objective in the nosepiece may be triggered by the apparatus 100. In this way, if the objective 140 is changed, e.g., by the control unit of the microscope system, a further triggering of the restriction of the relative movement of the objective 140 can be omitted.

In an example, the apparatus may be further configured to trigger an output for informing a user of the microscope system about a relative movement restriction of the objective 140. For example, the microscope system may comprise a display device which can be used to inform the user about the restriction of the relative movement of the objective.

The apparatus 100 shown in FIGS. 1*a* and 1*b* is alternatively or optionally, configured to receive, from the microscope system, position information about a relative position of an objective 140 of the microscope system. Further, the apparatus 100 is configured to compare the relative position information with an accessible spatial region for the objective 140. Further, the apparatus 100 is configured to control a relative movement of the objective 140 based on the comparison so that the objective 140 of the microscope system stays within the accessible spatial region. In this way, an objective crash can be avoided by controlling the relative movement of the objective 140.

As described above the position information can be received from the microscope system, e.g., the control unit. For example, the microscope system may comprise a motorized stage, which can be moved in the x-direction, y-direction and/or the z-direction. A position of the stage may be indicative of a position of the structure of the microscope system and thus may be indicative of the relative position of the objective 140 relative to the structure, e.g., a sample 172, a sample holder 170, a holding device 168.

Further, a relative position of the objective 140 can be changed, e.g., in the z-direction for focusing and/or in the x-direction and/or the y-direction for scanning and/or image acquisition of different samples. Thus, the relative position of the objective 140 may depend on the current position of the structure and/or the currently position of the objective 140.

By comparing the relative position of the objective 140 with the accessible spatial region a movement of the objective 140 can be controlled, e.g., by transmitting a control signal to a control unit of the microscope system indicative of a relative movement of the objective 140. For example, when the accessible spatial region indicates space for a relative movement of the objective 140, the apparatus 100 may determine a moving direction of the objective 140 based on the comparison with the relative position of the objective 140. For example, the relative movement may be controlled such that a minimum distance between the structure and the objective 140 may be not undershot.

In an example, the position information may comprise data about at least one of a relative position of the objective 140 in a direction parallel or perpendicular to a focus plane of the objective 140. In this way, the relative movement of the objective 140 can be controlled in a specific direction, e.g., in the z-direction for adjusting an autofocus routine and/or in the xy-plane for restricting a scanning.

In an example, the relative movement of the objective 140 may be controlled by a restriction of the relative movement in at least one of a direction perpendicular or a direction parallel to a focus plane of the objective 140. In this way, the relative movement of the objective 140 can be controlled for a critical direction.

The use of the apparatus 100 for an upright microscope system in FIG. 1*a* or an inverted microscope system in FIG. 1*b* is exemplary. In general, the apparatus 100 can be used for both an upright microscope system and an inverse microscope system.

As shown in FIG. 1 the respective interface circuitry 130 may be coupled to the respective one or more processors 110 at the apparatus 100. In examples the one or more processors 110 may be implemented using one or more processing units, one or more processing devices, any means for processing, such as a processor, a computer or a programmable hardware component being operable with accordingly adapted software. Similar, the described functions of the one or more processors 110 may as well be implemented in software, which is then executed on one or more programmable hardware components. Such hardware components may comprise a general-purpose processor, a Digital Signal Processor (DSP), a microcontroller, etc. The one or more processors 110 are capable of controlling the interface circuitry 130, so that any data transfer that occurs over the interface circuitry 130 and/or any interaction in which the interface circuitry 130 may be involved may be controlled by the one or more processors 110.

In examples the interface circuitry 130 may correspond to any means for obtaining, receiving, transmitting or providing analog or digital signals or information, e.g., any connector, contact, pin, register, input port, output port, conductor, lane, etc. which allows providing or obtaining a signal or information. The interface circuitry 130 may be wireless or wireline and it may be configured to communicate, e.g., transmit or receive signals, information with further internal or external components.

The apparatus 100 may be a computer, processor, control unit, (field) programmable logic array ((F)PLA), (field) programmable gate array ((F)PGA), graphics processor unit (GPU), application-specific integrated circuit (ASICs), integrated circuits (IC) or system-on-a-chip (SoCs) system.

More details and aspects are mentioned in connection with the examples described below. The example shown in FIG. 1 may comprise one or more optional additional features corresponding to one or more aspects mentioned in connection with the proposed concept or one or more examples described below (e.g., FIGS. 2-8).

FIG. 2 shows an example of a schematic illustration of a microscope system 200. The microscope system 200 comprises the apparatus described with reference to FIG. 1. Further, the microscope system 200 may comprise a number of optionally components, such as a base unit 210 (which may comprise the apparatus(es)) with a stand, a stage 266, holding device 268, a sample holder, a nosepiece 235 comprising multiple objectives 240, 242, 244, a pair of oculars 250. In general, these optional and non-optional components may be coupled to the apparatus 200 or a control unit of the microscope system 200, which may be configured to control and/or interact with the respective components.

The multiple objectives 240, 242, 244 may have a different magnification power, different outer dimension and different working distances. For example, the objective 242 with the highest magnification power may have the highest length and lowest working distance. Therefore, the objective 242 can only be used if the stage 266 is at a certain z-position, such that the objective 242 fits in the accessible spatial region. For example, the accessible spatial region may be defined by the distance between the stage 266, the objective 242 and the position and outer dimension of the holding device 268. Since the holding device 268 extends towards the objective 242, the accessible spatial region is reduced by the holding device 268. Thus, in the vicinity of the holding device 268 the objective 242 may be unusable, for example, focusing the sample may be obstructed by the holding device 268. Therefore, an autofocus routine may cause an objective crash between the objective 242 and the holding device 268 during an attempt of focusing. To prevent the objective crash and enabling image acquisition the apparatus of the microscope system 200 may trigger a change of the objective 242 such that the objective 244 is currently used for image acquisition. This may prevent an objective crash, as focusing with the objective 244 may be not obstructed by the holding device 268.

The relative position of the objective 240, 242, 244 of the microscope system 200 results from the position of the nosepiece, the position of the stage, the outer dimension of the currently used objective and the outer dimension of the structure, e.g., the sample holder (inverse) or the sample and the sample holder (upright). Thus, the relative position information may comprise data indicative for at least one of these parameters when this parameter can be changed by a user and/or the microscope system 200. 2 2 2 2 2 2

The microscope system 200 is an upright microscope system 200. In other examples than the one shown in FIG. 2, the upright microscope system 200 may be replaced by an inverse microscope system.

More details and aspects are mentioned in connection with the examples described above and/or below. The example shown in FIG. 2 may comprise one or more optional additional features corresponding to one or more aspects mentioned in connection with the proposed concept or one or more examples described above (e.g., FIG. 1) and/or below (e.g., FIG. 3-8).

Figure 3A:
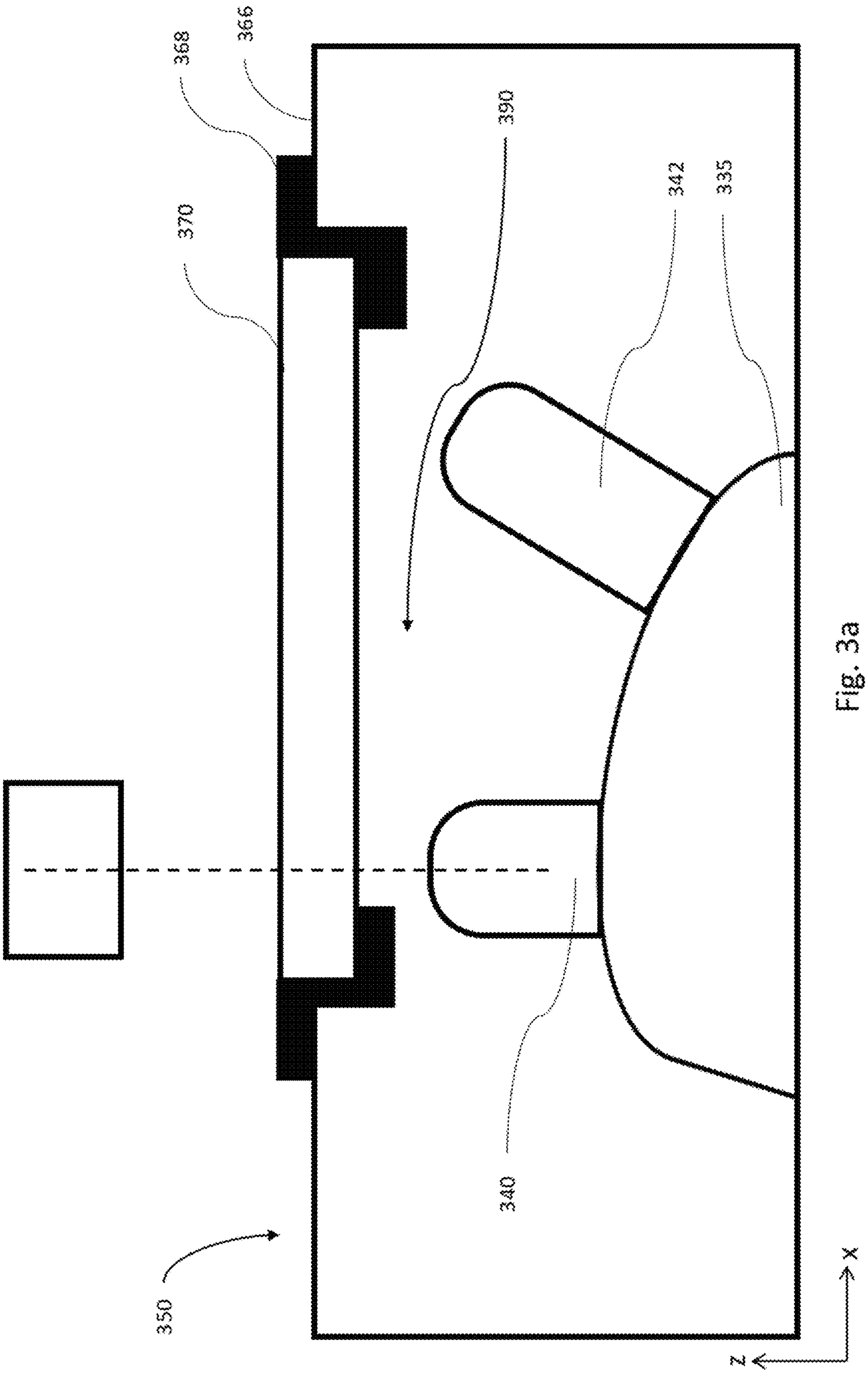
Figure 3B:
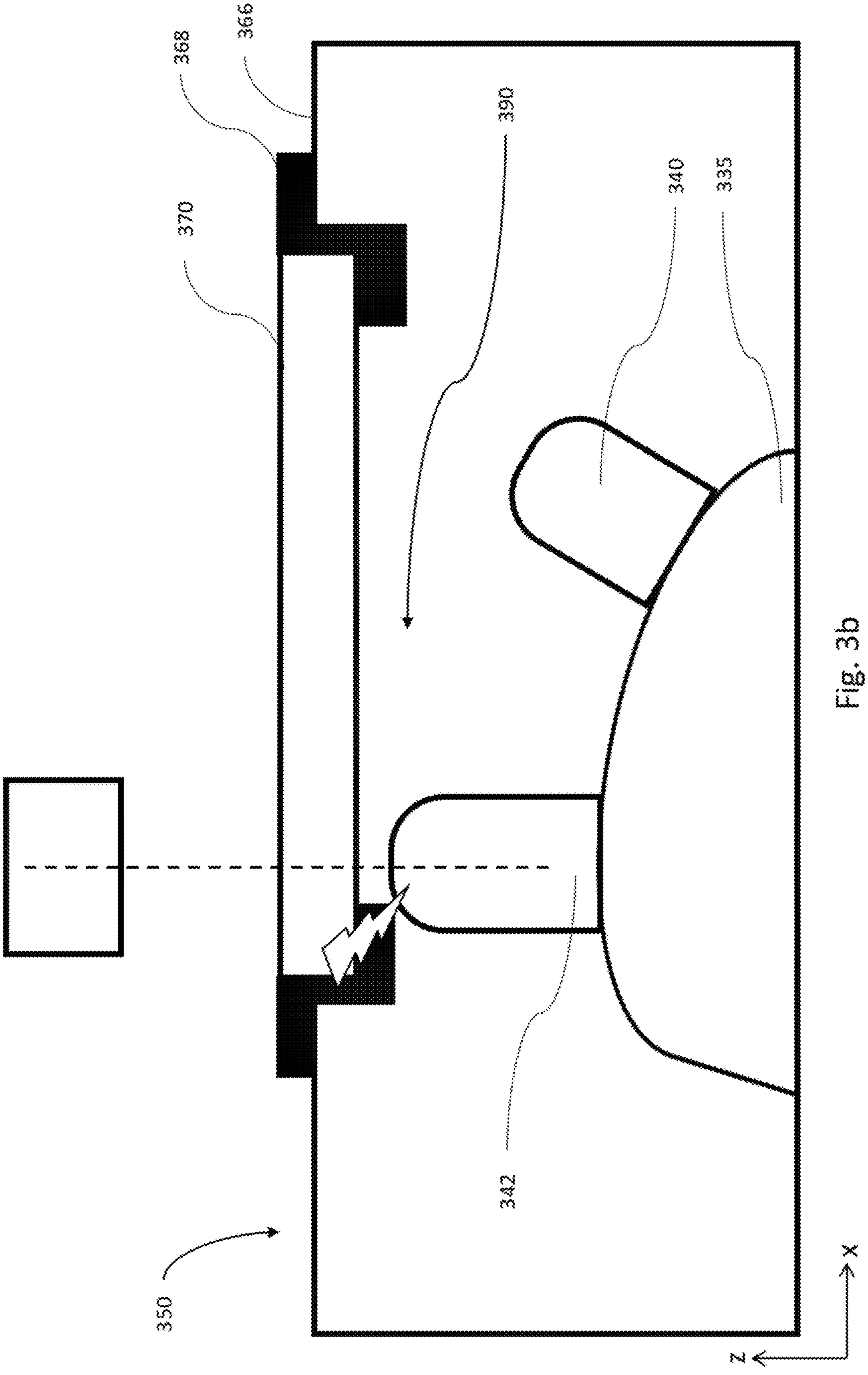

FIGS. 3*a* and 3*b* show a schematic illustration of a microscope housing part 350 shown in FIG. 1*c*. The incubation chamber 350 may be part of an inverse microscope system. Inside of the microscope housing part 350 a nosepiece 335 for changing a currently installed objective 340, 342 may be arranged. Multiple objectives 340, 342 may be mounted to the nosepiece 335. As shown in FIGS. 3*a*, 3*b* a first objective 340 may have a smaller length than a second objective 342.

The microscope housing part 350 may be designed to house the multiple objectives 340, 342 and enable a use of each objective 340, 342. For example, the accessible spatial region 390 may be defined by the inner dimension of the incubation chamber. However, the currently installed holding device 368 may protrude into the microscope housing part 350. Thus, an accessible spatial region 390 of the objectives 340, 342 may be affected by the holding device 368. Additionally, the sample holder 370 mounted to the holding device may protrude into the microscope housing part 350 due to the dimension of the holding device. Therefore, the sample holder 370 may also affect the accessible spatial region 390. For example, a movement in the z-direction may be affected.

By receiving the region information about the accessible spatial region 390 the apparatus can restrict a relative movement of the objectives 340, 342 to avoid an objective crash. The apparatus as described above (e.g., in FIG. 1) may receive the region information, e.g., indicative for an outer dimension of the holding device 368 (e.g., a type of the holding device 368), and can restrict the relative movement of the objectives 340, 342 in the z-direction. A restriction of the relative movement may further depend on the outer dimension of the objectives 340, 342. As shown in FIG. 3*b* an objective crash may occur for the second objective 342 for the same position of nosepiece 355 and holding device 368, since the second objective 342 has a greater length than the first objective 240.

This objective crash can be avoided by restricting a relative movement of the objective 342 in the x-direction. Further, if the nosepiece 355 and the holding device 368 are already in a position where an objective crash with the objective 342 can happen, e.g., as shown in FIG. 3*a*, changing the objective may be prohibited. For example, a trigger to change the objective may be prohibited. In this way, an objective crash by changing the objective can be avoided.

More details and aspects are mentioned in connection with the examples described above and/or below. The example shown in FIG. 3 may comprise one or more optional additional features corresponding to one or more aspects mentioned in connection with the proposed concept or one or more examples described above (e.g., FIG. 1-2) and/or below (e.g., FIG. 4-8).

Figure 4A:
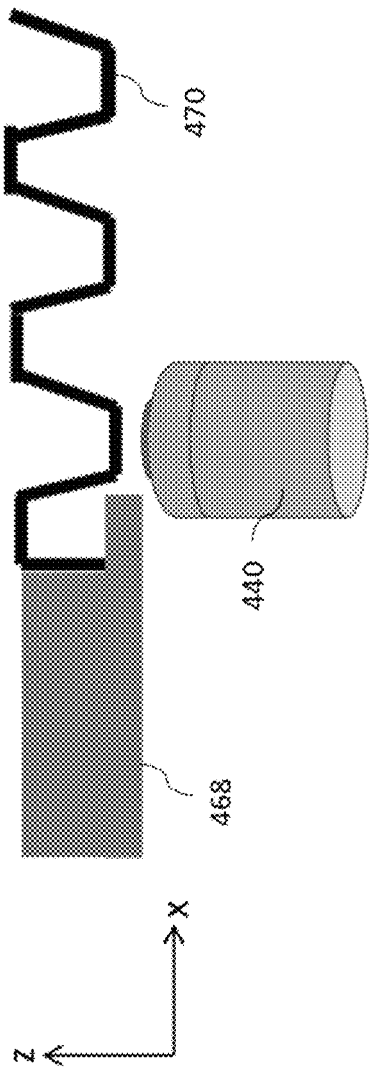
Figure 4B:
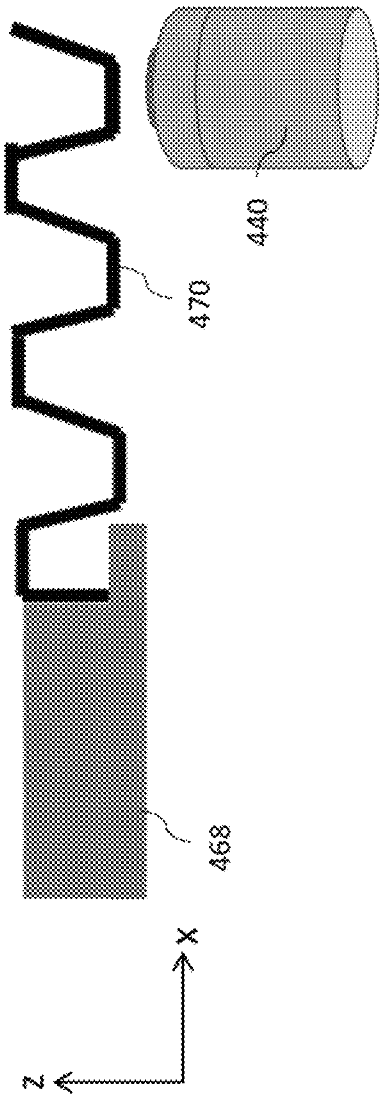

FIGS. 4*a* and 4*b* show examples of different relative position of an objective 440 to a sample holder 470 and a holding device 468. As can be seen in FIG. 4*a* the objective 440 may be next to an edge of the holding device 468. Thus, a movement of the objective 440 may be limited by the holding device 468. Therefore, a restriction of the relative movement of the objective 440 in the x-direction and/or in the z-direction may be necessary.

For example, for an autofocus routine or for a manual focusing of a user (e.g., by moving the stage or the objective 440) a restriction of the movement in the z-direction may be necessary to prevent a contact between objective 440 and the holding device 468. Depending on the currently used holding device 468 a likelihood of a contact in the edge region may be increased in comparison to a center region due to a protruding part of the holding device 468. In this case the path which can be traversed by the objective can be restricted by restricting a relative movement of the objective 440 in order to prevent a crash of the objective 440 with the protruding part of the holding device 468.

For example, a relative movement can be restricted by restricting focusing with the objective 440, selecting an autofocus routine, restricting a movement of the objective 440 and/or restricting a movement of the stage.

In general, the relative position of the objective 440 in FIG. 4*a* can be a critical relative position, indicating an increased likelihood of an objective crash. The likelihood of an objective crash may be increased due to the protrusion of the holding device 468. Therefore, a restriction of the relative movement of the objective 440 needs to be more restrictive as in comparison to FIG. 4*b*. For example, the restriction of the relative movement of the objective may comprise selecting an appropriate autofocus routine (e.g., restricting a relative movement in the z-direction) to prevent an objective crash.

In FIG. 4*b* the objective 440 is in an uncritical relative position, e.g., in a center region of the sample holder 470. For this relative position a likelihood of an objective crash is decreased.

Thus, an appropriate autofocus routine may allow a larger relative movement of the objective, e.g., in the z-direction.

More details and aspects are mentioned in connection with the examples described above and/or below. The example shown in FIG. 4 may comprise one or more optional additional features corresponding to one or more aspects mentioned in connection with the proposed concept or one or more examples described above (e.g., FIG. 1-3) and/or below (e.g., FIG. 5-8).

Figure 5:
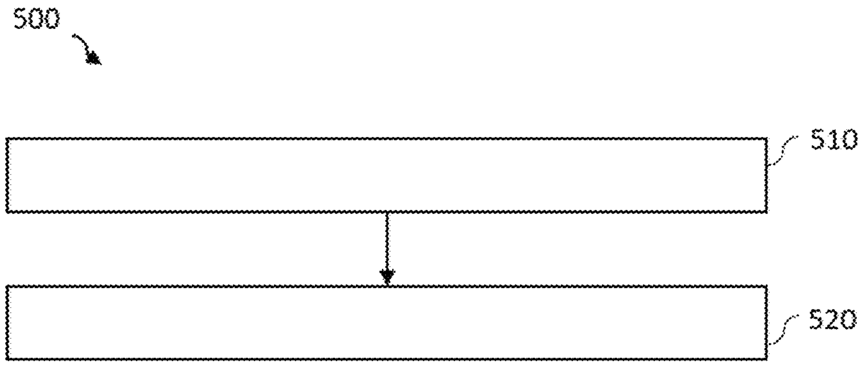
FIG. 5 shows an example of a method.

FIG. 5 shows an example of a method 500. The method 500 comprises receiving 510 region information about an accessible spatial region for an objective of the microscope system. Further, the method 500 comprises triggering 520 a restriction of a relative movement of the objective based on the information about the accessible spatial region. For example, the method 500 may be performed by an apparatus described with reference to FIG. 1 or FIG. 2.

More details and aspects are mentioned in connection with the examples described above and/or below. The example shown in FIG. 5 may comprise one or more optional additional features corresponding to one or more aspects mentioned in connection with the proposed concept or one or more examples described above (e.g., FIG. 1-4) and/or below (e.g., FIG. 6-8).

Figure 6:
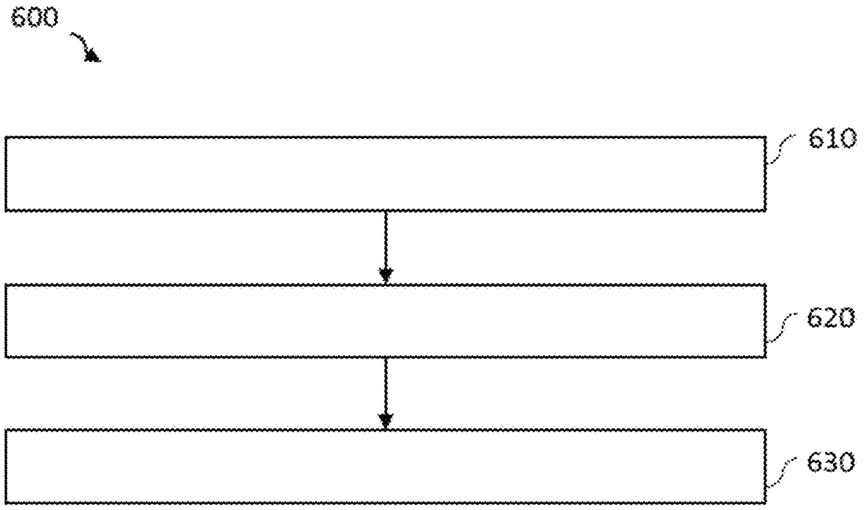
FIG. 6 shows another example of a method.

FIG. 6 shows another example of a method 600. The method 600 comprises receiving 610, from the microscope system, position information about a relative position of an objective of the microscope system. Further, the method 600 comprises comparing 620 the position information with an accessible spatial region of the objective and controlling 630 a relative movement of the objective based on the comparison so that the objective of the microscope system stays within the accessible spatial region. For example, the method 600 may be performed by an apparatus described with reference to FIG. 1 or FIG. 2.

More details and aspects are mentioned in connection with the examples described above and/or below. The example shown in FIG. 6 may comprise one or more optional additional features corresponding to one or more aspects mentioned in connection with the proposed concept or one or more examples described above (e.g., FIG. 1-5) and/or below (e.g., FIG. 7-8).

Figure 7:
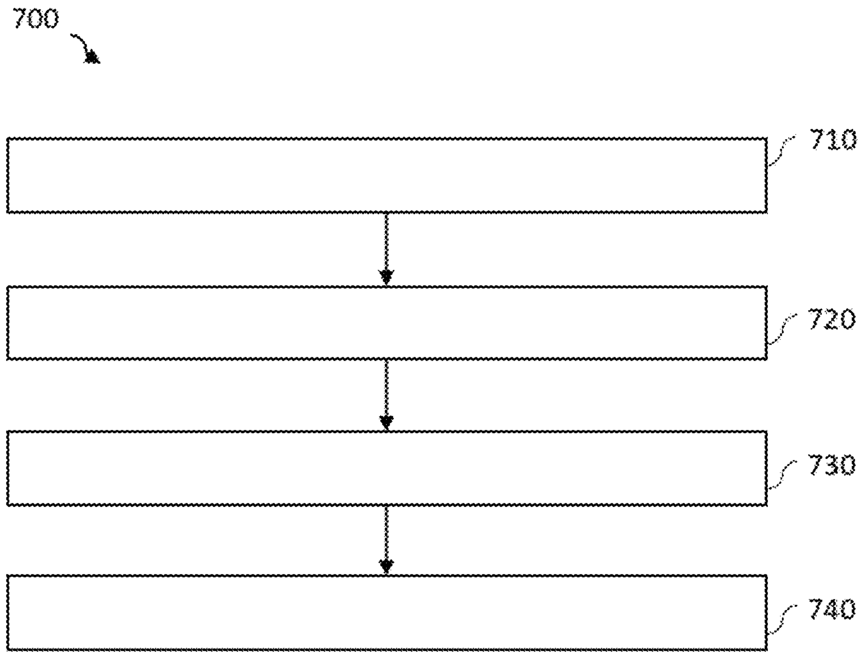
FIG. 7 shows another example of a method 700 for selecting an autofocus routine.

FIG. 7 shows another example of a method 700 for selecting an autofocus routine. The selection is based on an accessible spatial region and a relative position of the objective. The method 700 comprises determining 710 an accessible spatial region information. The information can be determined by a control unit of the microscope system and/or read out from a storage device of the microscope system. For example, the accessible spatial region may be defined by a parameter (e.g., an outer dimension such as a topography) of a sample holder, a sample, a holding device and/or an objective.

Further, the method 700 comprises determining 720 position information about a relative position of the objective relative to a structure of the microscope. The position information may be determined by the control unit of the microscope system, e.g., by read out a sensor coupled to the stage or the objective. For example, the position information may comprise data about a position of the structure and/or of the objective. Based on the position information the relative position of the objective relative to the structure can be determined by the control unit.

The method 700 further comprises determining 730 an autofocus routine based on the accessible spatial region and the relative position of the objective. For example, determining may comprise selecting an autofocus routine form a plurality of autofocus routines. By determining the autofocus routine a relative movement of the objective the z-direction may be restricted. Additionally, a relative movement of the objective in the z-direction can be further restricted by adjusting the autofocus routine.

Further, the method 700 may comprise controlling 740 the relative movement of the objective by use of the determined autofocus routine. In this way, an objective crash can be avoided.

More details and aspects are mentioned in connection with the examples described above and/or below. The example shown in FIG. 7 may comprise one or more optional additional features corresponding to one or more aspects mentioned in connection with the proposed concept or one or more examples described above (e.g., FIG. 1-6) and/or below (e.g., FIG. 8).

Figure 8:
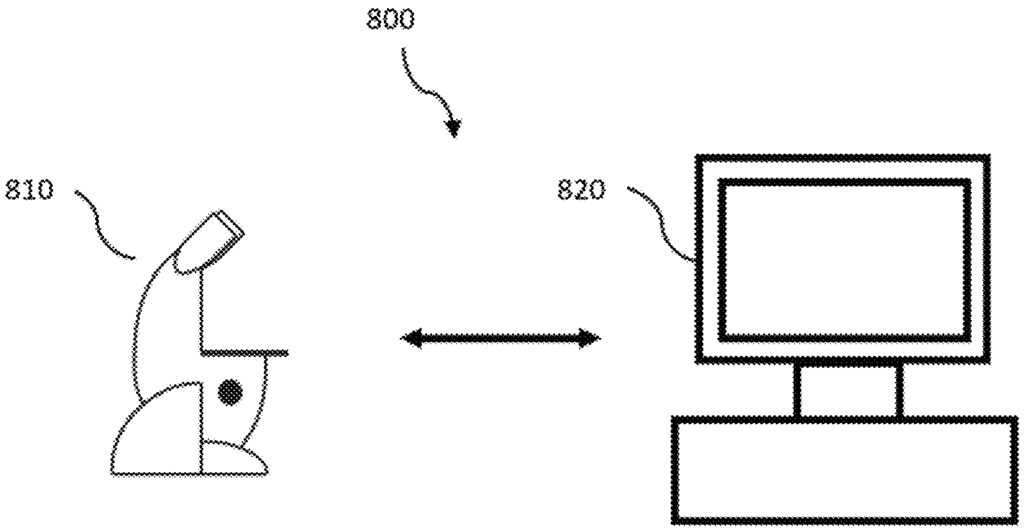
FIG. 8 shows a schematic illustration of a system.

Some embodiments relate to a microscope comprising an apparatus as described in connection with one or more of the FIGS. 1 to 7. Alternatively, a microscope may be part of or connected to an apparatus as described in connection with one or more of the FIGS. 1 to 7. FIG. 8 shows a schematic illustration of such a system 800 configured to perform a method described herein, e.g., with reference to FIGS. 5-7. The system 800 comprises a microscope 810 and a controlling unit (e.g., a computer system) 820. The microscope may comprise the apparatus as described above, e.g., with reference to FIG. 1 or FIG. 2. The microscope 810 is configured to take images and is connected to the computer system 820. The computer system 820 is configured to execute at least a part of a method described herein. The computer system 820 may be configured to execute a machine learning algorithm. The computer system 820 and microscope 810 may be separate entities but can also be integrated together in one common housing. The computer system 820 may be part of a central processing system of the microscope 810 and/or the computer system 820 may be part of a subcomponent of the microscope 810, such as a sensor, an actor, a camera or an illumination unit, etc. of the microscope 810.

The control unit 820 may be a local computer system or a computer device (e.g., personal computer, laptop, tablet computer or mobile phone) with one or more processors and one or more storage devices or may be a distributed computer system (e.g., a cloud computing system with one or more processors and one or more storage devices distributed at various locations, for example, at a local client and/or one or more remote server farms and/or data centers). The computer system 820 may comprise any circuit or combination of circuits. In one embodiment, the computer system 820 may include one or more processors which can be of any type. As used herein, processor may mean any type of computational circuit, such as but not limited to a microprocessor, a microcontroller, a complex instruction set computing (CISC) microprocessor, a reduced instruction set computing (RISC) microprocessor, a very long instruction word (VLIW) microprocessor, a graphics processor, a digital signal processor (DSP), multiple core processor, a field programmable gate array (FPGA), for example, of a microscope or a microscope component (e.g., camera) or any other type of processor or processing circuit. Other types of circuits that may be included in the computer system 820 may be a custom circuit, an application-specific integrated circuit (ASIC), or the like, such as, for example, one or more circuits (such as a communication circuit) for use in wireless devices like mobile telephones, tablet computers, laptop computers, two-way radios, and similar electronic systems. The computer system 820 may include one or more storage devices, which may include one or more memory elements suitable to the particular application, such as a main memory in the form of random access memory (RAM), one or more hard drives, and/or one or more drives that handle removable media such as compact disks (CD), flash memory cards, digital video disk (DVD), and the like. The computer system 820 may also include a display device, one or more speakers, and a keyboard and/or controller, which can include a mouse, trackball, touch screen, voice-recognition device, or any other device that permits a system user to input information into and receive information from the computer system 820.

More details and aspects are mentioned in connection with the examples described above. The example shown in FIG. 8 may comprise one or more optional additional features corresponding to one or more aspects mentioned in connection with the proposed concept or one or more examples described above (e.g., FIG. 1-7).

Some or all of the method steps may be executed by (or using) a hardware apparatus, like for example, a processor, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a non-transitory storage medium such as a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine readable carrier.

Other embodiments comprise the computer program for performing one of the methods described herein, stored on a machine readable carrier.

In other words, an embodiment of the present invention is, therefore, a computer program having a program code for performing one of the methods described herein, when the computer program runs on a computer.

A further embodiment of the present invention is, therefore, a storage medium (or a data carrier, or a computer-readable medium) comprising, stored thereon, the computer program for performing one of the methods described herein when it is performed by a processor. The data carrier, the digital storage medium or the recorded medium are typically tangible and/or non-transitionary. A further embodiment of the present invention is an apparatus as described herein comprising a processor and the storage medium.

A further embodiment of the invention is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, configured to, or adapted to, perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

The aspects and features described in relation to a particular one of the previous examples may also be combined with one or more of the further examples to replace an identical or similar feature of that further example or to additionally introduce the features into the further example.

LIST OF REFERENCE SIGNS

100 apparatus
102 control unit
104 connection
110 one or more processors
120 one or more storage devices
126 optical axis
130 interface circuitry
135 nosepiece
140 objective
150 microscope housing part
160 camera
164 opening
166 stage
168 holding device
170 sample
172 sample holder
180 illumination source
194 microscope system
198 microscope
200 microscope system
210 base2
235 nosepiece
240, 242, 244 objective
250 pair of oculars
266 stage
268 holding device
335 nosepiece
340, 342 objectives
350 microscope housing part
366 stage
368 holding device
370 sample holder
390 accessible spatial region
440 objective
468 holding device
470 sample holder
500 method for a microscope system
510 receiving region information about an accessible spatial region
520 triggering a restriction of a relative movement of the objective
600 method for a microscope system
610 receiving, from the microscope system, position information
620 comparing the position information with an accessible spatial region
630 controlling a relative movement of the objective
700 method for a microscope system for selecting an autofocus routine
710 determining an accessible spatial region information
720 determining position information about a relative position of the objective
730 determining an autofocus routine based on the accessible spatial region
740 controlling the relative movement of the objective
800 system
810 microscope
820 computer

The invention claimed is:

1. An apparatus for a microscope system, comprising one or more processors and one or more storage devices, wherein the one or more processors are coupled to the one or more storage devices and the one or more processors are configured to:

receive region information about an accessible spatial region for an objective of the microscope system;

trigger a restriction of a relative movement of the objective based on the region information;

select an autofocus routine from a plurality of autofocus routines based on the restriction of the relative movement of the objective; and perform the selected autofocus routine under the restriction of the relative movement of the objective, wherein the region information comprises data about at least one of a topography of a currently used sample holder or a topography of a currently used sample.

2. The apparatus according to claim 1, wherein the one or more processors are further configured to:

receive, from the microscope system, relative position information about a relative position of the objective;

compare the relative position of the objective and the accessible spatial region; and trigger the restriction of the relative movement of the objective based on the comparison of the region information and the relative position information.

3. The apparatus according to claim 1, wherein the restriction of the relative movement is a restriction in at least one of a direction perpendicular or a direction parallel to a focus plane of the objective.

4. The apparatus according to claim 1, wherein the one or more processors are further configured to trigger a change of the objective of the microscope system to another objective of the microscope system, wherein the accessible spatial region for the objective and the other objective is different.

5. The apparatus according to claim 1, wherein the one or more processors are further configured to trigger an output for informing a user of the microscope system about a relative movement restriction of the objective.

6. A microscope system, comprising an apparatus according to claim 1.

7. An apparatus for a microscope system, comprising one or more processors and one or more storage devices, wherein the one or more processors are configured to:

receive, from the microscope system, relative position information about a relative position of an objective of the microscope system;

compare the relative position information with an accessible spatial region for the objective;

control a relative movement of the objective based on the comparison so that the objective of the microscope system stays within the accessible spatial region;

select an autofocus routine from a plurality of autofocus routines based on the accessible spatial region for the objective; and perform the selected autofocus routine based on the accessible spatial region for the objective, wherein the accessible spatial region is determined based on data about at least one of a topography of a currently used sample holder or a topography of a currently used sample.

8. The apparatus according to claim 7, wherein the relative position information comprises data about at least one of a relative position of the objective in a direction parallel or perpendicular to a focus plane of the objective.

9. The apparatus according to claim 7, wherein the relative movement of the objective is controlled by a restriction of the relative movement in at least one of a direction perpendicular or a direction parallel to a focus plane of the objective.

10. A method for a microscope system, comprising:

receiving region information about an accessible spatial region for an objective of the microscope system;

triggering a restriction of a relative movement of the objective based on the information about the accessible spatial region;

selecting an autofocus routine from a plurality of autofocus routines based on the restriction of the relative movement of the objective; and performing the selected autofocus routine under the restriction of the relative movement of the objective, wherein the region information comprises data about at least one of a topography of a currently used sample holder or a topography of a currently used sample.

11. A non-transitory, computer-readable medium comprising a program code that, when the program code is executed on a processor, a computer, or a programmable hardware component, causes the processor, computer, or programmable hardware component to perform the method of claim 10.

12. A method for a microscope system, comprising receiving, from the microscope system, relative position information about a relative position of an objective of the microscope system;

comparing the relative position information with an accessible spatial region of the objective;

controlling a relative movement of the objective based on the comparison so that the objective of the microscope system stays within the accessible spatial region;

selecting an autofocus routine from a plurality of autofocus routines based on the accessible spatial region of the objective; and performing the selected autofocus routine based on the accessible spatial region of the objective, wherein the accessible spatial region is determined based on data about at least one of a topography of a currently used sample holder or a topography of a currently used sample.

* * * * *